United States Patent
Winterfeldt

[15] 3,673,211
[45] June 27, 1972

[54] MANUFACTURE OF $\alpha,\beta$-DIHALO-$\gamma$-HYDROXYCROTONIC LACTAMS

[72] Inventor: Ekkehard Winterfeldt, Berlin, Germany

[73] Assignee: Badische Anilin- & Soda-Fabrik Aktiengesellschaft, Ludwigshafen/Rhein, Land Rheinland-Pfalz, Germany

[22] Filed: March 18, 1969

[21] Appl. No.: 808,304

[30] Foreign Application Priority Data

March 23, 1968 Germany .................. P 17 70 042.4

[52] U.S. Cl. ........ 260/326.5 FL, 260/256.4 N, 260/326.14 T, 424/274, 71/95
[51] Int. Cl. .............................................. C07d 27/16
[58] Field of Search ............................ 260/326.5 F

[56] References Cited

UNITED STATES PATENTS 3,063,863  11/1962  Holland et al.................260/326.5 X

*Primary Examiner*—Alex Mazel
*Assistant Examiner*—Joseph A. Narcavage
*Attorney*—Johnston, Root, O'Keeffe, Keil, Thompson & Shurtleff

[57] ABSTRACT

Manufacture of $\alpha,\beta$-dihalo-$\gamma$-hydroxycrotonic lactams by reacting mucohalogenic acid halides with primary amines, as well as the new $\alpha,\beta$-dihalo-$\gamma$-hydroxycrotonic lactams themselves. The new products are valuable intermediates for the production of insecticides and fungicides.

6 Claims, No Drawings

MANUFACTURE OF α,β-DIHALO-γ-HYDROXYCROTONIC LACTAMS

The invention relates to the manufacture of α, β-dihalo-γ-hydroxycrotonic lactams by reacting mucohalogenic acid halides with primary amines, as well as to new substances of this type.

It is known to react mucobromic acid bromide and mucochloric acid chloride or their pseudo esters with ammonia to give mucobromic and mucochloric acid amides (J.Am.Chem.Soc., 16, 302 (1894)). The reaction of pseudomethyl esters of mucohalogenic acids with aniline results in an exchange of the β-halogen atom of the acid by the anilino group (J.Am.Chem.Soc., 76, 1242 (1954)). Furthermore, the formation of a thiazolidine by the reaction of mucochloric acid with penicillamine is described in J.Am.Chem.Soc., 74, 4094 (1952). An article in Berichte der Deutschen Chemischen Gesellschaft, 34, 1010 (1901) discloses the reaction of mucobromic acid and ethylene diamine to give compounds of the type

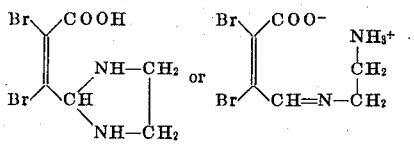

The preparation of γ-hydroxy-γ-aryl-monohalocrotonic lactams by reacting γ-aryl-α,β-dihalocrotonic lactones with primary amines is also known. (Coll. Czechoslov. Chem. Comm., 28, 3278(1963)).

The reaction of o-benzoyl-benzoyl-chloride with ethylene diamines gives a phenyl-phthalimidine having the formula

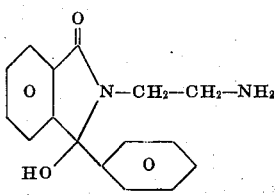

(J.Org.Chem., 32, 2185 et seq (1967); J.Am.Chem. Soc., 73, 4627(1951) ) and 66, 827(1944)). A reaction of mucohalogenic acid halides with amines in which a lactam ring is simultaneously formed and the halogen atom of the acid halide group is replaced by the hydroxyl group, has hitherto not been described.

The object of the invention is to provide a new process for the manufacture of α,β-dihalo-γ-hydroxycrotonic lactams in a simple manner and in good yields and purity.

A further object of the invention is the new α,β-dihalo-γ-hydroxycrotonic lactams themselves.

This and other objects of the invention are achieved and there are obtained in an advantageous manner α,β-dihalo-γ-hydroxycrotonic lactams having the general formula

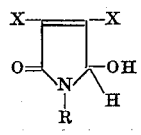

where R denotes a hydrogen atom or an aliphatic, cycloaliphatic, araliphatic, aromatic or heterocyclic radical and the individual radicals X may be identical or different and each denotes a halogen atom, by reacting mucohalogenic acid halides having the general formula

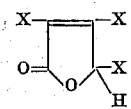

where X has the meaning given above, with ammonia or primary amines having the general formula $$R — NH_2 \quad III.$$

in which R has the meaning given above, at a temperature of form $-20$ to $+20°$ C.

The reaction may be represented by the following equation when mucochloric acid chloride and cyclohexylamine are used:

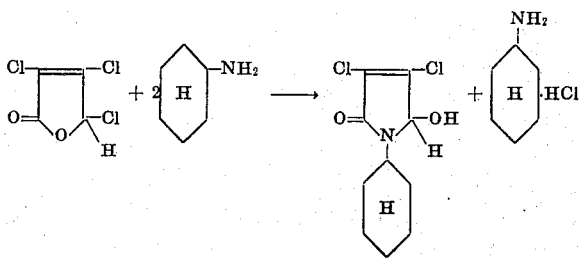

The process according to the invention yields, using easily accessible substances as starting materials, a large number of α,β- dihalo-γ-hydroxycrotonic lactams in a simple manner and in good yields. In view of the state of the art it was surprising to find that side reactions, e.g., replacement of halogen atoms by amino groups, splitting of the mucohalogenic acid ring and subsequent reaction of the aldehyde group with the amine, and formation of γ-halocrotonic acid derivatives, do not play an important part. It was also not to be expected that the end products of the process according to the invention would have a high purity in view of the disclosures in the abovementioned article in the Journal of Organic Chemistry because mucohalogenic acid halides are not true acid chlorides like the abovementioned o-benzoyl-benzoyl chloride for example, but are pseudohalides, the reactivity of the γ-chlorine atom only being the same as that of α-chlorine atoms in cyclic ethers (Houben-Weyl, Methoden der Organischen Chemie, Vol. 6/2, 724; J.Am.Chem.Soc., 72, 2535 et seq (1950)).

Preferred mucohalogenic acid halides having the general formula II and consequently the preferred end products I, are those in the formulae of which the individual radicals X are identical or different and each denotes a chlorine or bromine atom. Muco-chloric(bromic) acid chlorides or bromides for example can be used as starting material II.

Preferred primary amines having the general formula III and consequently preferred end products I are those in the formulae of which R denotes an alkyl, cycloalkyl, aralkyl or aryl radical having up to 12 carbon atoms or a 5– or 6– membered heterocyclic ring which may contain 1 or 2 nitrogen atoms and, if desired, may have a benzene nucleus anellated to it. The starting amine can be reacted with the starting material II in stoichiometric amounts or in excess, in general in an excess of up to 15 percent by weight. For example ammonia or the following amines can be used as starting material III : ethylamine, tryptamine, cyclohexylamine, cyclooctylamine, benzylamine, p-anisidine, p-nitroaniline, 2-aminopyrimidine, 2-aminopyrrole, 2-aminopyridine.

The reaction is carried out at a temperature of from $-20$ to $+20°$ C, preferably from 0 to 5° C, at atmospheric or superatmospheric pressure continuosly or batchwise. The starting materials are advantageously reacted in solution and/or suspension. Examples of suitable organic solvents which are inert under the reaction conditions are hydrocarbons, such as ligroin, cyclohexane and toluene; chlorinated hydrocarbons, such as carbon tetrachloride and methylene chloride; ketones, such as acetone and cyclohexanone; carboxylic esters, such as ethyl acetate and butyl acetate; ethers such as diethyl ether, tetrahydrofuran and dioxane; and mixtures of these solvents.

The reaction may be carried out as follows: a mixture of starting materials II and III with or without solvent is kept at the reaction temperature for 30 minutes to 5 hours. The end product is then separated in a conventional manner, e.g., by filtering the reaction mixture and evaporating down the filtrate. This mixture can also be poured into water and the crystallized end product filtered off or separated by extraction with a suitable solvent, e.g., methylene chloride.

the new compounds which can be obtained by the process according to the invention are valuable intermediates for the production of insecticides and fungicides. It is thus possible to manufacture from these products, by oxidation with fuming nitric acid, N-substituted dihalomaleimides which according to U.S. Pat. No. 2,980,694, British Pat. No. 852,634 and U.S. Pat. No. 2,865,730 for example have an insecticidal, fungicidal and herbicidal action. There may also be obtained from these compounds, by reaction with reducing agents, cyclic imides which according to Ann. der Chemie, 616, 183 (1958) have a fungicidal action.

The parts given in the Examples are by weight.

EXAMPLE 1

558 parts of mucochloric acid chloride dissolved in 3000 parts of anhydrous dioxane has slowly added to it with stirring at 0° to 5° C a solution of 960 parts of tryptamine in 7000 parts of dioxane. The mixture is then stirred for 5 hours at room temperature and is poured into water. Extraction is effected with methylene chloride and the organic phase is shaken with dilute hydrochloric acid. After evaporating down the methylene chloride solution 910 parts (corresponding to 97 percent of theory) of $\alpha,\beta$-dichloro-$\gamma$-hydroxy-N-($\beta$-indoyl)-ethyl-crotonic lactam having a melting point of 167° C (decomposition) is obtained.
Analysis: $C_{14}H_{12}O_2N_2Cl_2$ (311.2)
calculated: C 54.03 percent, H 3.89 percent, N 9.00 percent Cl 22.79 percent
found: C 54.12 percent, H 3.81 percent, N 8.64 percent, Cl 22.72 percent.

EXAMPLE 2

By reacting 562.5 parts of mucochloric acid chloride with 594 parts of cyclohexylamine, as described in Example 1, 480 parts (corresponding to 64 percent of theory) of $\alpha,\beta$-dichloro-$\gamma$-hydroxy-N-cyclohexylcrotonic lactam having a melting point of 156° C (recrystallized from ether) is obtained.
Analysis: $C_{10}H_{13}O_2NCl_2$ (250)
calculated: C 48.0 percent, H 5.2 percent, Cl 28.4 percent, N 5.6 percent
found: C 48.3 percent, H 5.0 percent, Cl 29.0 percent, N 5.2 percent.

EXAMPLE 3

By reacting 55 parts of mucochloric acid chloride with 60 parts of aniline, as described in Example 1, 57 parts (corresponding to 79 percent of theory) of $\alpha,\beta$-dichloro-$\gamma$-hydroxy-N-phenyl-crotonic lactam having a melting point of 134° C (recrystallized from ether) is obtained.
Analysis: $C_{10}H_7Cl_2O_2N$ (244.1)
calculated: C 49.20 percent, H 2.89 percent, N 5.74 percent.
found: C 49.42 percent, H 2.98 percent, N 5.45 percent.

EXAMPLE 4

By reacting 55 parts of mucochloric acid chloride with 67 parts of benzylamine, as described in Example 1, 58 parts (corresponding to 76 percent of the theory) of $\alpha,\beta$-dichloro-$\gamma$-hydroxy-N-benzyl-crotonic lactam having a melting point of 114° C (recrystallized from ether) is obtained.
Analysis: $C_{11}H_9Cl_2O_2N$ (258.1)
calculated: C 51.19 percent, H 3.52 percent, N 5.43 percent
found: C 51.31 percent, H 3.68 percent, N 5.31 percent.

EXAMPLE 5

By reacting 55 parts of mucochloric acid bromide with 50 parts of benzylamine, as described in Example 1, 47 parts (corresponding to 76 percent of the theory) of $\alpha,\beta$-dichloro-$\gamma$-hydroxy-N-benzylcrotonic lactam having a melting point of 114° C. (recrystallized from ether) is obtained.

I claim:

1. A compound of the formula

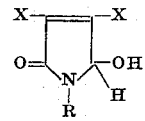

where R denotes hydrogen, an alkyl or cycloalkyl of up to 12 carbon atoms, benzyl, phenyl or phenyl substituted by methoxy or nitro, and the individual radicals X may be identical or different and each denotes chlorine or bromine.

2. $\alpha,\beta$-dichloro-$\gamma$-hydroxy-N-phenyl-crotonic lactam.

3. A process for the manufacture of a compound of the formula

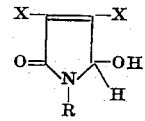

where R denotes hydrogen, an alkyl or cycloalkyl of up to 12 carbon atoms, benzyl, phenyl or phenyl substituted by methoxy or nitro, and the individual radicals X may be identical or different and each denotes chlorine or bromine, wherein mucohalogenic acid halides having the formula

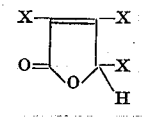

where X has the meaning given above, are reacted with ammonia or primary amines having the formula

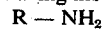

where R has the meaning given above, at a temperature of from −20 to +20° C.

4. A process as claimed in claim 3, wherein the starting amine III is reacted in an excess of up to 15 percent by weight.

5. A process as claimed in claim 3, wherein the reaction is carried out at a temperature of from 0 to 5° C.

6. A process as claimed in claim 3, wherein the reaction is carried out in the presence of an inert organic solvent.

* * * * *